United States Patent [19]

Cheng

[11] 4,048,067
[45] Sept. 13, 1977

[54] FILTERING PROCESS AND APPARATUS

[75] Inventor: Paul J. Cheng, Bartlesville, Okla.

[73] Assignee: Phillips Petroleum Company, Bartlesville, Okla.

[21] Appl. No.: 586,319

[22] Filed: June 12, 1975

[51] Int. Cl.$^2$ .................. B01D 37/00; B01D 21/26
[52] U.S. Cl. .................. 210/73 R; 210/84; 210/96 R; 210/512 R
[58] Field of Search .................. 210/73, 83, 84, 512, 210/96 R, 65; 209/144, 211; 55/97, 463

[56] References Cited

U.S. PATENT DOCUMENTS

| | | | |
|---|---|---|---|
| 1,927,817 | 9/1933 | Allan | 209/144 |
| 2,005,770 | 6/1935 | Bleser | 210/304 |
| 2,631,728 | 3/1953 | Popp | 209/211 X |
| 2,855,099 | 10/1958 | Koning | 209/211 X |
| 3,061,098 | 10/1962 | Brezinski | 209/211 |
| 3,353,678 | 11/1967 | Dragon | 210/236 |
| 3,383,310 | 5/1968 | Ammer | 210/96 X |
| 3,485,362 | 12/1969 | Spruyt et al. | 209/211 X |
| 3,489,680 | 1/1970 | Snavely, Jr. | 210/23 |

FOREIGN PATENT DOCUMENTS

| | | | |
|---|---|---|---|
| 952,611 | 3/1964 | United Kingdom | 209/211 |

*Primary Examiner*—Frank W. Lutter
*Assistant Examiner*—William A. Cuchlinski, Jr.

[57] ABSTRACT

Solids contained in liquids can be effectively separated therefrom by tangentially introducing these liquids into a downwardly converging conically shaped chamber, the walls of which consist of material porous to the liquid but impervious to the solid materials, withdrawing lean liquid from the axial upper portion of the chamber and collecting the clean liquid from the exterior of the chamber wall.

8 Claims, 2 Drawing Figures

FILTERING PROCESS AND APPARATUS

This invention relates to filtering liquids. In one of it more specific aspects this invention relates to the filtering of oil-containing solids.

Particularly, this invention relates to the filtering of a liquid carbon black feedstock.

BACKGROUND OF THE INVENTION

In various fields of the technique, liquids have entrained therein solid particles. In order to remove these solid particles from the liquids, they are passed through filters. During such filtering processes, however, the solids accummulate on the filter material and in its pores. This reduces the efficiency of such filters more and more so that eventually the operation of the filter has to be shut down either to remove the layer of solids from the filter material or to replace the entire filter material by a fresh one. It would be desirable to have a continuously operable filter system and filtering process.

THE INVENTION

It is an object of this invention to provide a new filtering process.

Another object of this invention is to provide a filtering process to remove solids from heavy hydrocarbon oil.

Still another object of this invention is to provide a process for removal of solids from liquid hydrocarbon feedstocks for carbon black reactors.

Still a further object of this invention is to provide a new apparatus for continuously removing solids from liquids.

Figure 1:
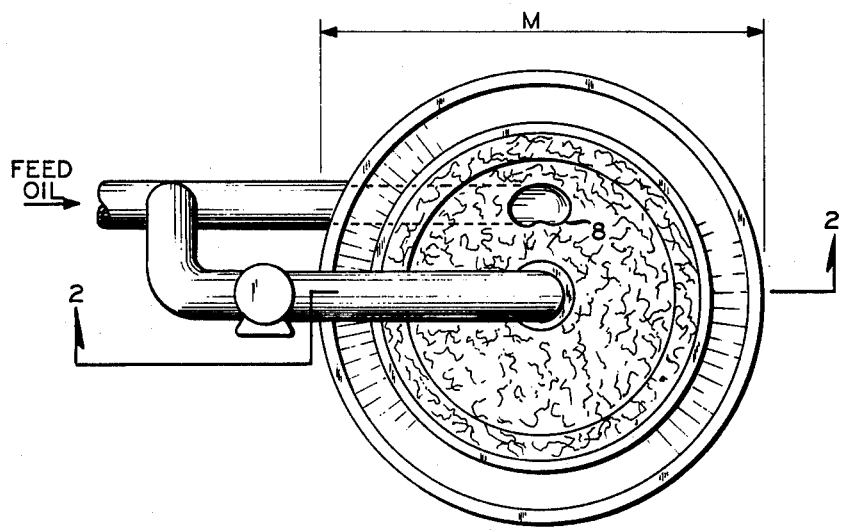
Figure 2:
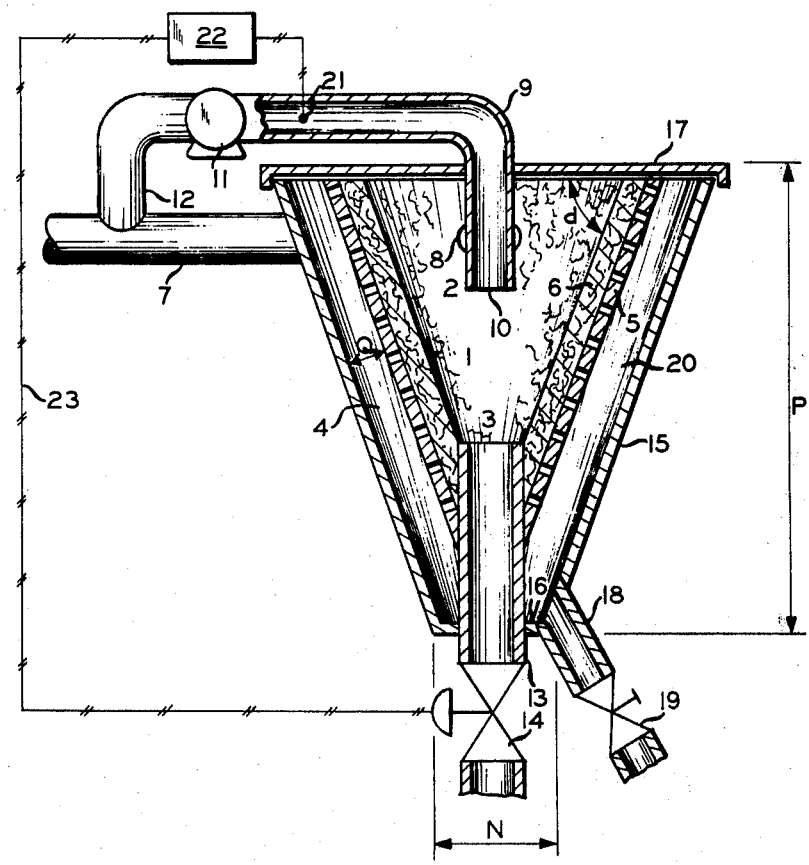

These and other objects, aspects, advantages, features and details of this invention will become apparent to those skilled in the art from the following description of the invention, from the appended claims, and the drawing which shows in FIG. 1 a top view of the filtering apparatus of this invention and in FIG. 2 a cross-section through the apparatus shown in FIG. 1.

In accordance with this invention, a liquid containing solids entrained therein can be separated from these solids by introducing this liquid tangentially into a separation chamber comprising the downwardly converging essentially conically shaped wall which is porous to the liquid and impervious to the entrained solids, withdrawing a portion of the lean liquid with some solids approximately at the axis of the separation chamber from the upper section of the separation chamber and collecting the clean liquid that has passed through the porous wall.

The tangential introduction of the liquid as well as the conically shaped separation chamber have the effect that the solid materials concentrate on the wall, whereas lean liquid is essentially present near the axis of the separation chamber. By lean liquid, such a liquid is to be understood which has been precleaned by this separation effect just described but has not yet passed through the filter. The liquid which has passed through the filter is called clean liquid.

In the preferred embodiment of this invention, the lean liquid withdrawn from the upper section of the separation chamber is reintroduced into the separating chamber. This can conveniently be done by pumping the lean liquid into the feedline for the liquid to be filtered.

In another embodiment of this invention, a mixture of solid and liquid which accumulates in the lower narrower section of the separating chamber is withdrawn from this section. This is preferably done intermittently, e.g., whenever a lean liquid withdrawn from the upper section of the separating chamber has reached a certain content of solids.

Whereas this invention can be applied to any filtering problem, it is presently preferred to use the invention for removing solids (both carbonaceous and inorganic) from hydrocarbon feedstocks for carbon black reactors. These solids contained particularly in oils of high aromaticity are one of the sources of so-called grit, which is a mixture of carbonaceous particles and abrasive non-carbonaceous particles. Small quantities of grit already deteriorate properties of articles containing such grit-containing carbon black.

The filter medium used depends upon both the liquid employed and the solid materials to be removed from this liquid. In the presently preferred case of cleaning heavy aromatic hydrocarbon feedstock for carbon black reactors, the filter material is preferably selected from the group consisting of bonding or sintered particles of ceramic, metal, carbon, and polymers. The filter material can also consist of tensioned filter cloth or felt. The filter materials can be self-supporting, however, preferably they are supported on a perforated metal support.

The filter dimensions can be varied in broad ranges. The angle $d$ between the conically shaped wall and the horizontal plane will preferably be in the range of about 60 to about 85°.

The operating conditions of the filter system again depend upon the liquids and solids involved. For the separation of highly aromatic oils for producing clean feedstocks for carbon black reactors, the process conditions preferably are as follows:

Separating unit pressure, about 5 to about 50 psig.
Temperature in the separating chamber, about 200° to about 450° F.
Pressure drop across the filter medium, about 8 psi.

Feedstocks for carbon black reactors that can be effectively filtered employing the process of this invention can be characterized as having an aromaticity of about 90 to 180 BMCI (Bureau of Mines Correlation Index). The solids which are contained in such feedstocks have a relatively broad particle size distribution. The filter material used for filtering the carbon black feedstock advantageously has the same mesh number as the sieve used for the grit test by which the quantity of oversize carbon black solids and non-carbon black solids in the carbon black is measured. Presently, the grit is measured using a 325 mesh sieve; therefore it is presently preferred to use a filter material of about 325 mesh (U.S. sieve) or smaller.

Another embodiment of this invention consists in an apparatus for filtering a liquid containing solid particles. This apparatus comprises a separating chamber confined by an essentially conically shaped wall, said wall converging in downward direction and being porous for the liquid but essentially impervious for said solid particles, first conduit means attached to the apparatus for essentially tangential introduction of said liquid into the upper section of said separating chamber, second conduit means attached to the apparatus for the withdrawal of lean liquid essentially in axial and upward direction, said second conduit means having a suction opening arranged in the upper portion and on the axis of said separating chamber, and collecting means for collecting the liquid penetrating through that conically shaped wall attached to the apparatus.

In the preferred embodiment of this apparatus, the outlet of the second conduit means is connected to the first conduit such as to recycle the liquid from the center of the separating chamber to the locus of tangential introduction of the liquid to be separated.

In accordance with a further embodiment of this invention, a third conduit means is connected to the lower portion of the separating chamber. Through this third conduit means the rich liquid, that is, for instance, dirty oil or high solids-content material, is removed perferably intermittently from the separating chamber.

The second conduit in accordance with one embodiment of this invention is connected to the suction end of a pump and the outlet of this pump is then connected to the first conduit means.

In accordance with a preferred embodiment of this apparatus, the wall confining the separation chamber consists essentially of a frusto-conically shaped perforated metal support the interior of which is covered by a layer of porous filter medium. The support provides the necessary strength whereas the filter medium is designed to be highly pervious to the liquid but impervious to the solid material to be removed from the liquid.

The collecting means for collecting the clean liquid having moved through the filter material can be of any shape and arrangement. It is, however, in accordance with a further embodiment of this invention presently preferred to arrange a frustoconically shaped shell arranged in the same sense and coaxially with the wall confining the separating chamber and having a bottom connected to the lower end of the shell as well as an outlet conduit connected to the lowest portion of said shell. This shell has two essential functions. On the one side this shell protects the porous wall or filter confining the separation chamber and the shell also prevents dirt entrained, for instance, by the surrounding air, from being incorporated into the clean oil. The last-mentioned function is particularly effective if the shell is also provided with a lid on the wide top end thereof.

The invention will be more fully understood from the following description of the drawing.

In FIGS. 1 and 2 there is shown the top view and a cross-section of an apparatus for carrying out the filtering process. The cross-section shown in FIG. 2 is taken along line 2—2 of FIG. 1; the lid covering the apparatus being shown in FIG. 2 is not shown in FIG. 1.

The filtering apparatus comprises a separating chamber 1, which has an upper section 2 and a lower section 3. The separating chamber 1 is confined by an essentially frustoconically shaped wall 4. This frustoconically shaped wall 4 arranged in downwardly converging direction with its axis arranged vertically consists essentially of a frustoconically shaped support of perforated metal 5 covered with a layer of porous filter medium 6.

One conduit 7 is attached to the apparatus, for instance to a nonshown support, said conduit 7 being arranged for essentially tangential introduction of the liquid/solid mixture to be separated. This conduit 7 has an outlet opening 8 which is arranged near the top of the chamber 1, and the liquid flows in essentially tangential direction into this chamber as can best be seen from FIG. 1.

A conduit 9 is attached to the apparatus for axial withdrawal of lean liquid from the upper section 2 of the chamber 1. This conduit 9 has a withdrawal opening 10 located on the axis roughly in the center of the chamber 1. The conduit 9 is further connected to a pump 11 which in turn is connected via conduit 12 to the feed conduit 7. The frustoconical wall 4 confines the separating chamber 1 in its lower narrower end in a conduit 13, which in turn is connected to a valve 14.

Surrounding the frustoconically shaped wall 4 is a shell 15 which also converges downwardly and is arranged coaxially to the frustoconical wall 4. The shell is connected to a bottom ring 16 and is covered by a lid 17 (not shown in FIG. 1). The bottom ring 16 in turn is connected to an outlet pipe 18 which is connected to a valve 19.

The operation of the apparatus just described is as follows:

The liquid containing the solid material is introduced via conduit 7 tangentially into the upper portion 2 of the separating chamber 1. While moving along the filter material 6 in a vortex-like movement, the liquid is pressed through the filter material leaving the separating chamber and entering the space 20 between the shell 15 and the frustoconical wall 4. This clean liquid can be withdrawn by opening valve 19.

Because of the cyclone or centrifugal effect, the solid materials are thrown outward and concentrate on the filter material so that liquid with a reduced solid content can be withdrawn by pump 11 via opening 10 and conduit 9. This lean liquid is reintroduced via conduit 7 together with the liquid to be cleaned. The liquid introduced via opening 8 into the separating chamber 1 has a self-cleaning effect on the filter apparatus; in other words, the incoming liquid washes away any solids deposited on the filter. Thus the solid materials more and more accumulate in the lower section 3 of the separating chamber 1. From this lower section, these solids are intermittently removed via conduit 13 and valve 14. Thus the entire filtering process can be a continuous process. This process can even be ornamentized by sensing the solids content of the liquid leaving through conduit 9, generating a signal correspondingly and actuating valve 14 in response to said signal whenever the solids concentration in the liquid has reached a predetermined upper level. Such a control mechanism is indicated in FIG. 2 by the sensing means 21, sensing the content of the recycled liquid, a signal generating means 22 and a signal transfer line 23 actuating the automatic valve 14.

In the following, calculated data for the typical operation as well as for the measures of a filter unit as shown in FIGS. 1 and 2 are given:

| Typical Operation | |
|---|---|
| Operating pressure, at feed oil inlet (8) psig | 15 |
| Operating temp., ° F | 300 |
| Feed Oil (1): | |
|     Gallons per hour | 300 |
|     Boiling range, ° F | 500 to 1000 |
|     API at 60° F | 1.0 |
|     Insolubles content, wt. % | 0.06 |
|     Velocity from inlet before going recycle flow, ft/sec. | 2 |
|     Velocity at tangential inlet, ft/sec. | 8 |
| Cleaned Oil (18): | |
|     Gallons per hour | 296.5 |
|     Insolubles content, wt. % | 0.002 |
| Concentrated Dirty Oil (13): | |
|     Gallons per hour | 3.5 |
|     Insolubles content, wt. % | 5 |
| Recycle Oil (9): | |
|     Gallons per hour | 900 |

| Filter Unit Measures | |
| --- | --- |
| Diameter (M), inches | 20 |
| Diameter (N), inches | 5 |
| Height (P), inches | 45 |
| Annulus (Q), inches | 2 |
| Angle (d), degrees | 80 |
| Filter medium thickness, inches (porous stainless steel) | 0.25 |
| Sintered particles size, microns | 20 |

The above-described dimensions can be varied depending on the desired throughput. The angle $d$ will usually be in the range of about 60° to about 85°. The filter material 6 employed in the specific example given is porous stainless steel.

Reasonable variations and modifications which will be apparent to those skilled in the art can be made in this invention without departing from the spirit and scope thereof.

I claim:

1. A filtering process comprising
 a. tangentially introducing a liquid having entrained solid particles therein into a separating chamber confined by a downwardly converging, essentially conically shaped wall which is porous to said liquid but essentially impervious to said solid particles;
 b. withdrawing a first portion of said liquid as a lean liquid approximately at the axis of said separating chamber from the upper section of said separating chamber and reintroducing at least a portion thereof tangentially into said separating chamber;
 c. withdrawing a second portion of said liquid as a mixture of said solids and said liquid from the lower section of said separating chamber;
 d. recovering a third portion of said liquid as clean liquid that has passed through said wall which is porous to said liquid as a product of the process, and wherein
  the solids content of said first portion of liquid is sensed, a corresponding signal is generated and said withdrawal of said second portion of said liquid is actuated responsive to said signal, whenever said signal has reached a value corresponding to an upper limit of solids concentration in said first portion withdrawn from the upper section of said separating chamber.

2. A process in accordance with claim 1 wherein said liquid introduced into said separating chamber is a carbon black feedstock.

3. A process in accordance with claim 1 wherein said feedstock is an oil having an aromaticity of 90 to 180 BMCI.

4. A process in accordance with claim 1 wherein said porous wall has a porosity at most as large as the sieve used to measure the grit content of carbon black made from said feedstock.

5. An apparatus for filtering a liquid containing solid particles comprising
 a. a separating chamber having an upper section and a lower section confined by an essentially conically shaped wall, said wall
  aa. converging in downward direction and
  bb. being of sufficient porosity to permit passage of liquid but essentially impervious to solids;
 b. first conduit means attached to said apparatus for essentially tangential introduction of a liquid into the upper section of said separating chamber;
 c. second conduit means attached to said apparatus for withdrawal of lean liquid essentially in an axial and upward direction, said second conduit having a suction opening arranged in the upper portion and on the axis of said separating chamber and an outlet connected to said first conduit means such as to recycle the lean liquid from the separating chamber to the inlet thereof;
 d. third conduit means connected to the lower portion of said separating chamber to remove a solids-rich liquid;
 e. collecting means for collecting and removing from said apparatus the liquid penetrating through said conically shaped wall;
 f. sensing means for sensing the solids content of the liquid in the second conduit means;
 g. signal generating means connected to said sensing means for generating a signal corresponding to the solids content sensed;
 h. a valve connected to said third conduit means; and
 i. valve actuating means the input of which is connected to said signal generating means and the output of which is connected to said valve such as to actuate said valve whenever a signal is received which corresponds to an upper limit of the solids content in the liquid in the second conduit means.

6. An apparatus in accordance with claim 5 wherein said second conduit is connected to the suction end of a pump and the outlet of said pump is connected to said first conduit means.

7. An apparatus in accordance with claim 5 wherein said separating chamber is confined by a wall consisting essentially of a frustoconically shaped perforated metal support, the interior of which is covered by a layer of porous medium.

8. An apparatus in accordance with claim 5 wherein said collecting means consists essentially of
 a. a frustoconically shaped shell arranged in the same sense and coaxially with the wall confining said separating chamber;
 b. a bottom piece connected to said shell;
 c. a lid covering at least the gap section at the upper section of the separating chamber between the frustoconically shaped shell and the wall confining the separating chamber; and
 d. outlet conduit means connected to the lowest portion of said bottom piece for the removal of clean liquid.

* * * * *